July 8, 1924.
H. COULLERY
PORTABLE TREADLE LATHE
Filed March 22, 1922
1,500,672
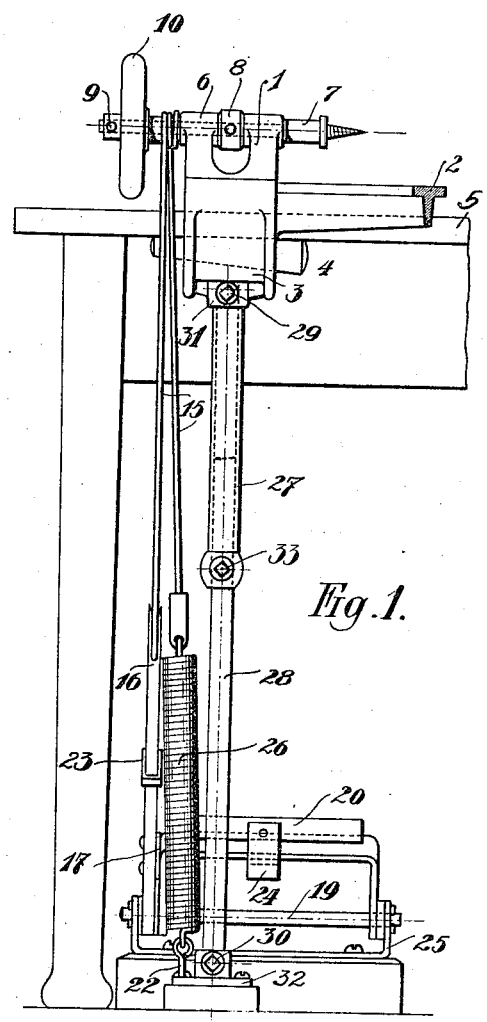
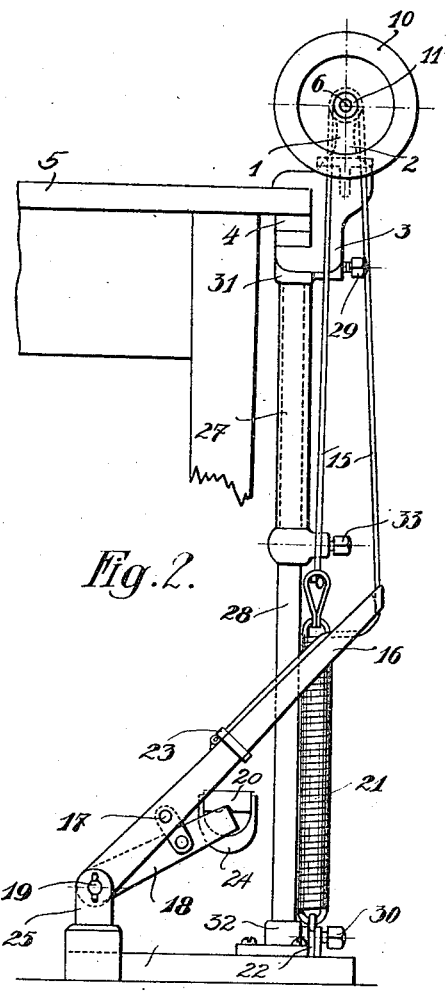
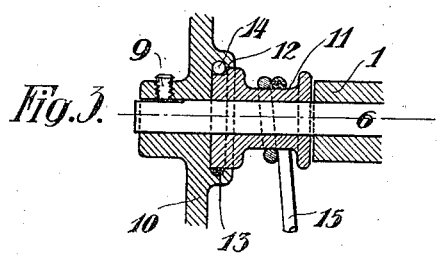
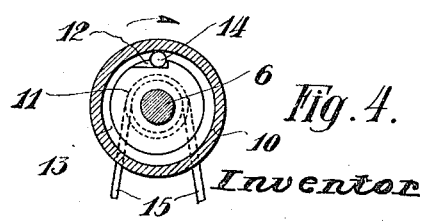
Inventor
H. Coullery,
By Marks & Clerk Attys.

Patented July 8, 1924.

1,500,672

UNITED STATES PATENT OFFICE.

HENRI COULLERY, OF LA CHAUX-DE-FONDS, SWITZERLAND.

PORTABLE TREADLE LATHE.

Application filed March 22, 1922. Serial No. 545,873.

*To all whom it may concern:*

Be it known that I, HENRI COULLERY, a citizen of the Republic of Switzerland, residing at La Chaux-de-Fonds, Switzerland, have invented certain new and useful Improvements in Portable Treadle Lathes, of which the following is a specification.

My invention relates to an improved treadle-lathe constructed in order to constitute an apparatus whose weight and dimensions are very small with regard to its capacity. This lathe may be instantaneously mounted on any table whatever without requiring any special bench or base. This improved lathe may be further easily taken to pieces which latter may be grouped and transported in a very small space. Referring to the annexed drawing representing, as descriptive but not restrictive example, a form of execution of the invention:

Fig. 1 is a front view of the lathe mounted on a table and ready for use;

Fig. 2 is a side view of the same lathe and

Figs. 3 and 4 are detail views of the mechanism transmitting the motion of the treadle to the shaft of the lathe.

The frame of the lathe consists of the head-stock 1 which is of one piece with the bed 2 and with the carrier 3 through which the lathe is instantaneously fixed, by means of the wedge 4, to the edge of the table 5 which may be an ordinary table and which does not offer the special conditions of solidity and stability generally required in a lathe-bench.

The shaft 6 is pivoted in the head-stock bearings; the longitudinal play of said shaft 6 being limited by the shaft-nose 7 and by the sleeve 8 fixed on the shaft by means of the screw whose head is to be seen on the drawing.

The accessory organs and the tools fixed on the shaft and on the lathe bed are not represented in the drawing. According to the sort of these organs and tools, the apparatus will be a turning-machine, a drilling-machine, a milling-machine, a grinding-machine, a polishing-machine, etc., whose shaft carries the piece to be worked or the tool. The shaft will eventually be used as intermediate shaft if the nature of the work requires an increase or a reduction of the speed.

At the extremity of the part of the shaft exceeding the posterior bearing are fixed, by means of the screw 9, the fly-wheel 10, and the grooved driving-pulley 11, which is loosely mounted on the shaft, turns freely, with a small play, between the bearing and the fly-wheel. A notch 12 milled in the pulley (Figs. 3 and 4) and a groove 13 whose section is semi-circular and which is turned in the fly-wheel constitutes a space for a steel ball 14, so that the ball, together with the pulley and the fly-wheel, constitute a friction rack-mechanism.

The pulley is driven by a rope 15 winding itself on the pulley. At one of its extremities, this rope is fixed to the lever 16 connected by the rod 17 to the clip 18 pivoting with the lever on the spindle 19 and carrying the treadle 20. The rope is constantly stretched at its other extremity by a spiral spring 21 hooked to the treadle base 22 and whose initial tension may be adjusted by means of the tightening device 23 of the lever 16. On the interior side of the treadle, a groove is provided, thus allowing the treadle to overlap the edge of the clip and thus to oscillate, according to the position of the foot. When the treadle is free, it is held in horizontal position by the fall-flange 24. The pivot spindle 19 is held by the treadle base consisting of the metallic support 25 screwed in the wooden bottom 26 consisting of two pieces fastened together at T.

When at rest, as represented, the lever 16 and the treadle 20 are held up by the spring 21. When the foot causes the treadle to move downwards, the rope drives the pulley which moves the fly-wheel in the direction of the arrow (Fig. 4), this by means of the ball 14 wedging between the two pieces. When the foot moves upwards, the spring moves the pulley backwards and raises the treadle; the ball then ceases to wedge and the shaft continues running in the same direction, its motion being maintained by the energy momentarily supplied by the fly-wheel.

For this operation, it is indispensable that the base be motionless. This is obtained by means of a telescopic removable column 27 and 28 inserted between the base and the lathe and fastened respectively by the screws 29 and 30 in the socket 31, of one piece with the clip, and in the sleeve 32 screwed on the base. The length of the column is adjusted, according to the height of the table, by clamping the screw 33 in order that the base stands firm on the floor and that the lathe and the table be at the same time suitably supported.

All forces tending to displace or to raise the base of the treadle or such forces which could bend or tip the table are thus balanced by the column and the treadle may be driven as energetically as that of a lathe firmly fixed on a special bench. The capacity of the lathe is moreover secured, notwithstanding the small diameter and the small mass of the flying-wheel, by the great angular speed which is possible to be obtained when using a treadle driving a fly wheel by means of a locking mechanism.

In order to remove the lathe from the table, it is sufficient, after having unhooked the spiral spring from the base and after having unrolled the rope from the pulley, to remove the column by unclamping the screws 29, 30 and 33 and to drive the wedge 4 out. The lathe with its fly-wheel (pieces 1—14), the treadle and its base (pieces 16—26) and the column (pieces 27 and 28), shortened as much as possible, then compose three different parts which may easily be grouped and transported under a very small space, eventually in a portable box.

The form of execution described and represented is a descriptive but not restrictive example. It is, of course, possible to replace certain organs by other equivalent organs; it is, e. g., possible to replace the wedge by a clamping screw, or the only piece formed by the head-stock, the bed and the carrier by pieces fastened together; it would also be possible to use a ratchet-locking mechanism instead of a ball-locking mechanism or to use, instead of the rope and of the pulley, a transmission chain driving a chain-wheel it would further be possible to replace the spiral spring by a rubber band or by a bundle of rubber threads; it is also possible, by using a spiral spring in a barrel, to suppress the tightening device of the lever 16 and to hook the spring to a piece fixed at variable height on the column; the base of the treadle may also consist of a single piece of metal; the column could also be replaced by a trellis-work provided with a tightening device for extending it.

I claim:

1. In a portable treadle lathe, a head stock, a floor-engaging base, a rotary spindle carried by the head stock, driving means for said spindle partially supported upon the base and extending to the spindle, means for clamping the head stock to a support, and adjustable means connecting the head stock with the base constituting spacing means permitting the attachment of the clamping means for the head stock to supports of varying elevations, the base remaining in engagement with a floor.

2. A portable treadle lathe comprising a head stock, clamping means carried by said head stock whereby the latter may be secured to a support, a base member, a treadle carried by the base member, a spindle journaled in the head stock, means for transmitting movement of the treadle to the spindle, and extensible connections between the head stock and base, said extensible connection including relatively adjustable members carried by the head stock and base, respectively, and means for securing said adjustable members in adjusted position.

In testimony whereof I hereunto affix my signature.

HENRI COULLERY.